United States Patent [19]

Schmidt

[11] Patent Number: 5,559,899
[45] Date of Patent: Sep. 24, 1996

[54] METHOD FOR THE ADAPTIVE QUANTIZATION OF A RANGE OF INPUT VALUES

[75] Inventor: Hauke Schmidt, Ulm, Germany

[73] Assignee: Robert Bosch GmbH, Stuttgart, Germany

[21] Appl. No.: 165,605

[22] Filed: Dec. 9, 1993

[30] Foreign Application Priority Data

Dec. 11, 1992 [DE] Germany .................... 42 41 812.7

[51] Int. Cl.$^6$ .................................................. G06K 9/62
[52] U.S. Cl. .................... 382/224; 382/270; 382/271; 364/724.10; 364/715.04
[58] Field of Search ............................. 382/51, 270, 224; 364/724.1, 715.04

[56] References Cited

U.S. PATENT DOCUMENTS

| | | | |
|---|---|---|---|
| 4,760,604 | 7/1988 | Cooper et al. | 382/15 |
| 4,847,786 | 6/1989 | Wang et al. | 382/51 |
| 5,027,306 | 6/1991 | Dattorro et al. | 364/724.1 |
| 5,075,872 | 12/1991 | Kumagai | 382/51 |

OTHER PUBLICATIONS

R. Sedgewick, *Algorithms*, 2d ed., Addison–Wesley Publishing Co., 1988, pp. 202–212.
D. Freedman, et al., "On the Histogram as a Density Estimator: L$_2$Theory", Journal of Probility Theory and Related Fields 57, 1981, pp. 453–476.
K. E. Willard, et al., "Nonparametric Probability Density Estimation Improvements to the Histogram for Laboratory Data", Computers And Biomedical Research 25, 1992, pp. 17–28.

*Primary Examiner*—Jose L. Couso
*Assistant Examiner*—Anh Hong Do
*Attorney, Agent, or Firm*—Kenyon & Kenyon

[57] ABSTRACT

A method for the adaptive quantization of the range of input values on the basis of the histogram method for estimating density. Input values are read-in and assigned to a quantization of the range of input values. From the distribution of the input values, a density-estimate function is determined which is transformed into a monotonically rising mapping function. The range of values of the mapping function is divided into equally sized sub-ranges which are translated into corresponding partitions in the range of input values. A new quantization of the range of input values is achieved which distributes the limited number of partitions so that a large number of small partitions are assigned to ranges of large fluctuations in the input-value distribution, and a small number of large partitions are assigned to ranges of small fluctuations in the input-value distribution.

15 Claims, 15 Drawing Sheets

METHOD FOR THE ADAPTIVE QUANTIZATION OF A RANGE OF INPUT VALUES

FIELD OF THE INVENTION

The present invention relates to a method and apparatus for the quantization of a range of measured quantities. More specifically, the present invention relates to a method and apparatus for adaptively varying the quantization size in relation to the distribution of the measured quantities.

BACKGROUND OF THE INVENTION

Methods for estimating the distribution density of input values over a range of input values are used, for instance, in classifying samples. The histogram density-estimation method is a nonparametric method for estimating the distribution density of input values over a range of input values.

Such a method can be illustrated with an example related to determining the distribution of various dark gray values for a series of workpieces, such as for purposes of quality control. The gray values of a series of workpieces are measured and assigned to a scale of gray values. In assessing the color quality of the workpieces, the criterion of interest is the distribution density over the entire range of gray values, as opposed to the exact gray values of the individual workpieces.

In determining the distribution density of measured gray values of a series of workpieces over a range of input values, the range of gray values is divided up into partitions, or grades of gray values, and each measured gray value is assigned to that partition within which it falls. Dividing the range of input values into partitions and defining the size of the partitions is referred to as quantization. Measured gray values assigned to each partition are counted and divided by the size of the partition and the entire number of measured gray values. In this manner, an average density is determined for each partition and is treated as an estimated density value. This is carried out for all partitions in the range of input values, so that an estimation of the distribution density of the input values is made over the range of input values.

The smaller the partitions, the more closely the distribution density of the histogram represents the actual distribution of the measured gray values. As the partitions are made smaller, however, more partitions are needed, the number of random samples needed to formulate statistically significant estimation values increases, and the cost of computing the distribution density increases.

In a known histogram method for estimating density, the range of input values is divided up into partitions of a constant size. See, e.g., K. E. Willard, "Nonparametric Probability Density Estimation: Improvements to the Histogram for Laboratory Data", Computers And Biomedical Research, 25, 1992, pp. 17–28. In this method, however, the specified number of partitions is not optimally adapted to the distribution of input values over the entire range of input values, so that the estimation of distribution density that is made is inaccurate.

In another known histogram method for estimating density, the size of the partitions is optimized with the aid of computational methods, on the condition that the size be the same for all partitions and that the number of partitions be freely selectable to obtain the most precise possible estimation of distribution density. See, e.g., D. Freedman, "On the Histogram as a Density Estimator: $L_2$ Theory", Journal of Probability Theory and Related Fields 57, 1981, pp. 453–476. This method, however, entails a high degree of complexity and does not achieve optimal quantization for distributions of input values with abrupt value fluctuations.

SUMMARY OF THE INVENTION

The present invention relates to a quantization method and apparatus in which the sizes of partitions are adapted to the distribution of input values over the range of input values. Thus, given a limited number of partitions, a distribution density function is established that reproduces the actual distribution of the input values as accurately as possible. Moreover, in the method of the present invention, quantization of the range of input values is carried out automatically and is continually repeated, allowing the quantization to be adapted to changing distributions of input values.

According to the present invention, estimated density values for each partition are first determined and low-pass filtered. The cut-off frequency with which the filtering occurs is determined by estimating the variance of the estimated density value of each partition. The variance represents the mean square deviation of the filtered density estimate in one partition from the average density estimate. The smaller the filtered density estimate deviates from the average density estimate, the less the density estimate was corrupted by the low-pass filtering or by statistical fluctuations. The method of the present invention is effectively simplified by determining the variance at the midpoints of the partitions without loss of accuracy in the frequency adaptation. The average estimated density is stored and continually compensated by measuring conditional statistical fluctuations in the estimated values, as well as irregularities among the partitions.

The filtered density estimate function then undergoes a differentiation or subtraction operation (i.e, the differences between adjacent values are generated). The absolute values of the differentiated, filtered density estimate function are then generated. The absolute values of the differentiated, filtered density estimate function then undergo an integration or summation operation (i.e., function values are cumulatively summed).

The function resulting from the above operations is used to generate a new set of partitions of the input value range. The range of values of the resultant function is first divided into equally sized sub-ranges. The sub-ranges are then mapped, or translated, using the inverse of the resultant function, into new partitions in the range of input values.

In an alternative embodiment, a second low-pass filtering of the density-estimate function is performed after the summing operation. The second filtering makes it possible to achieve a quantization with fewer input values that is better adapted than when only one low-pass filtering is performed. The second low-pass filtering is preferably carried out with the same cut-off frequency as the first low-pass filtering.

A further simplification is achieved by also performing the low-pass filtering of the density-estimate function only at the midpoints of the partitions, so that a filtered value is obtained for each partition. In this case, a discontinuous stepwise function results again after the filtering, thus necessitating the second low-pass filtering after the summing operation.

In another embodiment, when a new quantization is determined, the count values representing the number of input values assigned to each partition, are weighted by a factor between zero and one which takes into account the overlapping of the previous quantization with the new quantization and the degree of change in the quantization. This prevents abrupt changes in the quantization, which could lead to inaccurate results in the estimated density values.

When there is a change in the quantization, it is particularly advantageous to weight the change in the partition boundaries with a factor of between zero and one, to achieve a suitable damping of the change in the partition boundaries.

DETAILED DESCRIPTION OF THE DRAWINGS

Figure 1:
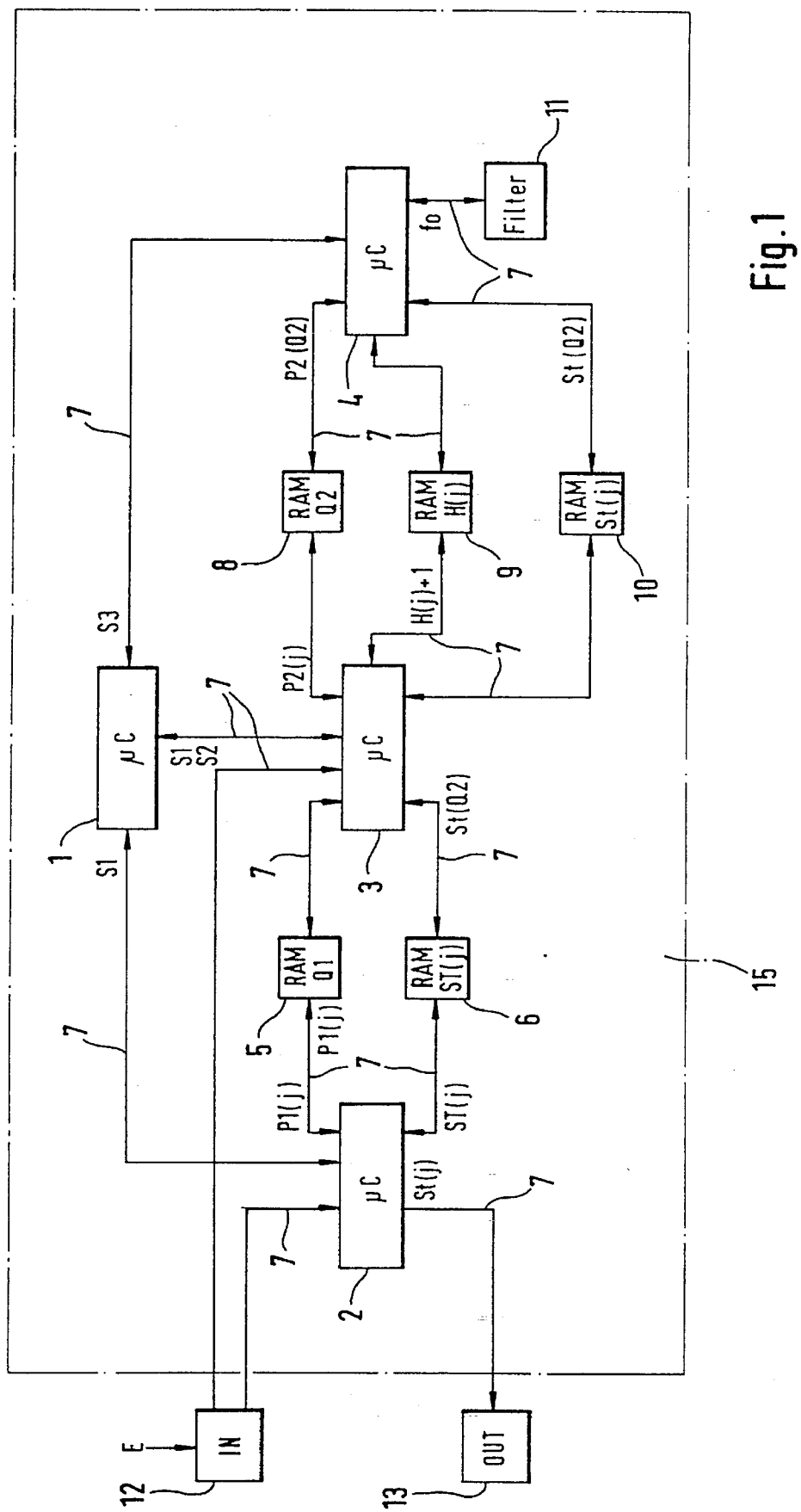
FIG. 1 is a schematic representation of a circuit arrangement for a first embodiment of the present invention.

FIG. 1 shows a first embodiment of a circuit in accordance with the present invention. In the circuit of FIG. 1, a first microprocessor 1 is linked via data lines 7 to a second microprocessor 2, a third microprocessor 3, and a fourth microprocessor 4. The microprocessor 2 is linked via additional data lines 7 to a first interface 12, a second interface 13, a first storage device 5, and a second storage device 6. The microprocessor 3 is linked via additional data lines 7 to the interface 12, the storage device 5, the storage device 6, a third storage device 8, a fourth storage device 9, and a fifth storage device 10. The microprocessor 4 is linked via additional data lines 7 to the storage device 8, the storage device 9, the storage device 10, and a low-pass filter 11.

The arrangement comprising the microprocessors 1, 2, 3, and 4, the storage devices 5, 6, 8, 9, and 10, and the low-pass filter 11 can be viewed as one processing unit 15.

Figure 2:
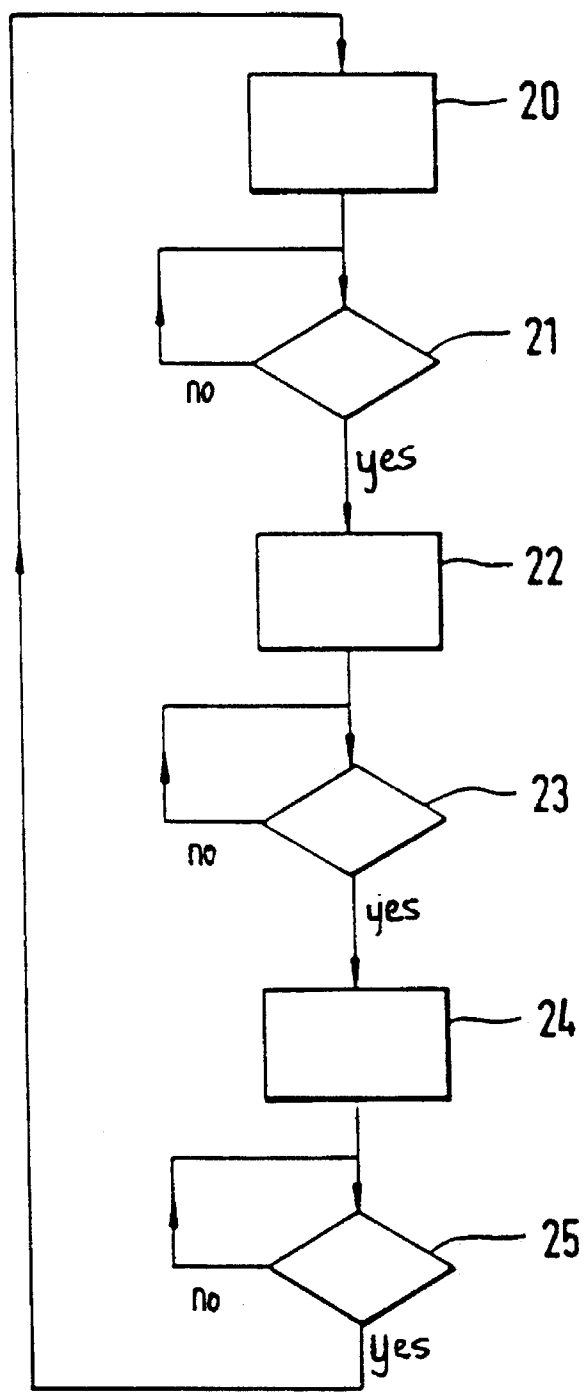
FIG. 2 is a flow chart depicting the operation of a first microprocessor in the first embodiment of the present invention.

The method of operation of the circuit of FIG. 1 is depicted by the flow charts of FIGS. 2 through 5. FIG. 2 is a flow chart depicting the operation of the microprocessor 1 which controls the work cycles of the microprocessors 2, 3, and 4. At block 20, the microprocessor 1 transmits a signal S1 to the microprocessors 2 and 3. At block 21, the microprocessor 1 waits for the signal S1 to be sent back by both the microprocessors 2 and 3. If the microprocessor 1 receives the signal S1 from both the microprocessors 2 and 3, the microprocessor 1, at block 23, then transmits a signal S2 to the microprocessor 3. The microprocessor 1 then waits at block 23 for the microprocessor 3 to send back the signal S2. If this occurs, the microprocessor 1 then transmits, at block 24, a signal S3 to the microprocessor 4. At the subsequent block 25, the microprocessor 1 waits for the signal S3 to be sent back by the microprocessor 4. If this occurs, operation then returns back to the beginning at block 20.

Figure 3:
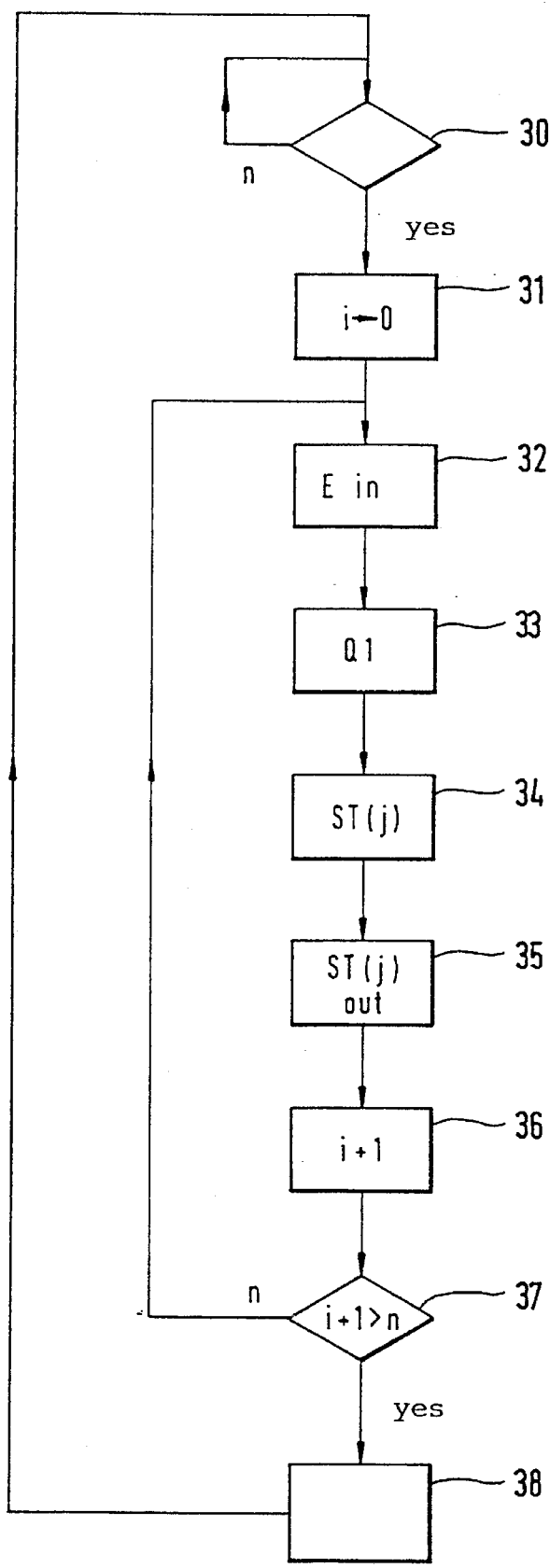
FIG. 3 is a flow chart depicting the operation of a second microprocessor in the first embodiment of the present invention.

A flow chart depicting the operation of the microprocessor 2 is shown in FIG. 3. At block 30, the microprocessor 2 waits for the signal S1 to be sent by the microprocessor 1. If the microprocessor 2 receives the signal S1, then at block 31, a controlled variable i is set to zero and an input value E is read-in at block 32 via the interface 12. At block 33, during a first quantization Q1, the microprocessor 2 searches in the storage device 5 for the partition in which the input value falls. Density estimates ST(j) associated with the partitions P1(j) of the first quantization Q1 are stored in the storage device 6 in a table of estimated values ST. At block 34, the microprocessor 2 searches for the estimated density value ST(j) that is stored in the table of estimated values ST and that is associated with the partition P1(j) determined at block 33. At block 35, the microprocessor 2 outputs the estimated density value ST(j) via the interface 13.

The variable i is then incremented by one at block 36, followed by a comparison at block 37 to determine whether the variable i is greater than a predetermined number n of input values E to be read-in. If i is not greater than n, operation returns to block 32 and the above procedure is repeated. If the value of i exceeds the number n, the microprocessor 2 retransmits the signal S1 to the microprocessor 1 at block 38, and operation returns to block 30.

Figure 4:
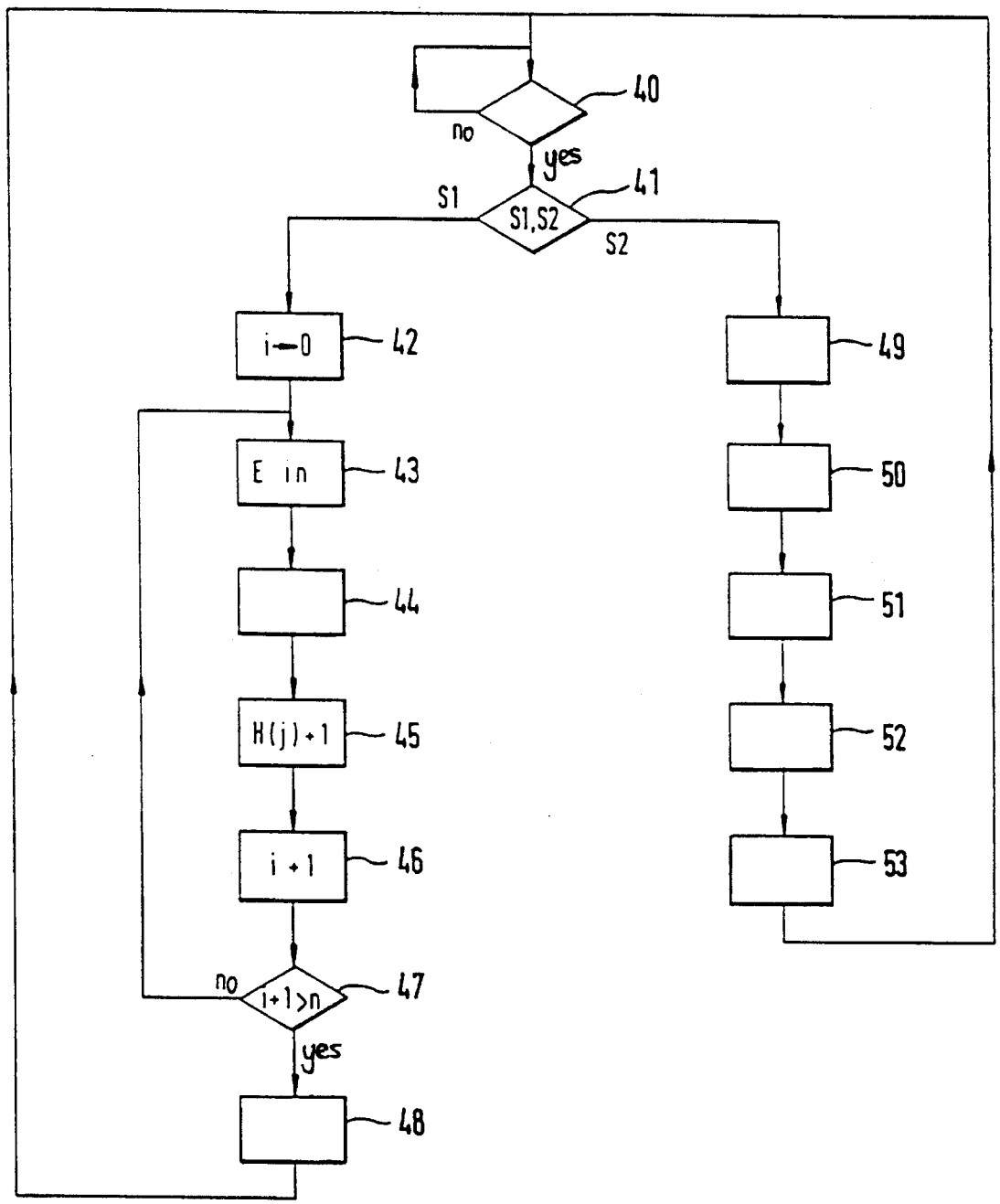
FIG. 4 is a flow chart depicting the operation of a third microprocessor in the first embodiment of the present invention.

The flow chart of FIG. 4 describes the method of operation of the microprocessor 3. At block 40, the microprocessor 3 waits for a signal from the microprocessor 1. If a signal is received, a query follows at block 41 to determine whether the received signal is the signal S1 or S2. If the signal S1 was received, operation branches to block 42, where the variable i is reset to zero.

After block 42, at block 43, the microprocessor 3 reads in an input value E via the interface 12. The microprocessor 3 then searches, at block 44, for the partition P2(j), of a second quantization Q2 stored in the storage device 8, within which the input value E falls. A count value H(j) is maintained in the storage device 9 for each partition P2 of the second quantization Q2. Each count value H(j) represents the number of input values E falling within the corresponding partition P2(j). At block 45, the count value H(j) of the partition P2(j) in which the input value E falls, is incremented by one. At block 46, which immediately follows, the variable i is also incremented by one. A comparison follows at block 47 to determine whether the variable i is greater than the predetermined number n of input values E to be read in. If not, operation returns to block 43 and runs through once more. If i is greater than n, operation then branches to block 48, where the microprocessor 3 transmits the signal S1 to the microprocessor 1. Operation then returns to block 40.

If, at block 41, it is determined that the microprocessor 3 received the signal S2, operation branches to block 49, where the microprocessor 3 transfers the second quantization Q2, stored in the storage device 8, to the storage device 5 as a new first quantization Q1, and the first quantization Q1 that had been stored in the storage device 5, is erased.

At block 50, density estimates ST(j) are calculated by the microprocessor 3 on the basis of the count values H(j) stored in the storage device 9. For this purpose, the count value H(j) is divided by the size V(j) of the particular partition P2(j) and by the total number n of input values E previously read-in, i.e., ST(j)=H(j)/n*V(j), where V(j)=PG2(j)−PG2(j−1).

At block 51, the calculated density estimates ST(j) are transferred by the microprocessor 3 to the storage device 6 as a new table of estimated values ST, and the previous table of estimated values is erased. In addition, at block 52, the microprocessor 3 stores the calculated density estimates ST(j) in the storage device 10. The microprocessor 3 then retransmits the signal S2 at block 53 to the microprocessor 1, and operation of the microprocessor 3 returns to block 40.

Figure 5:
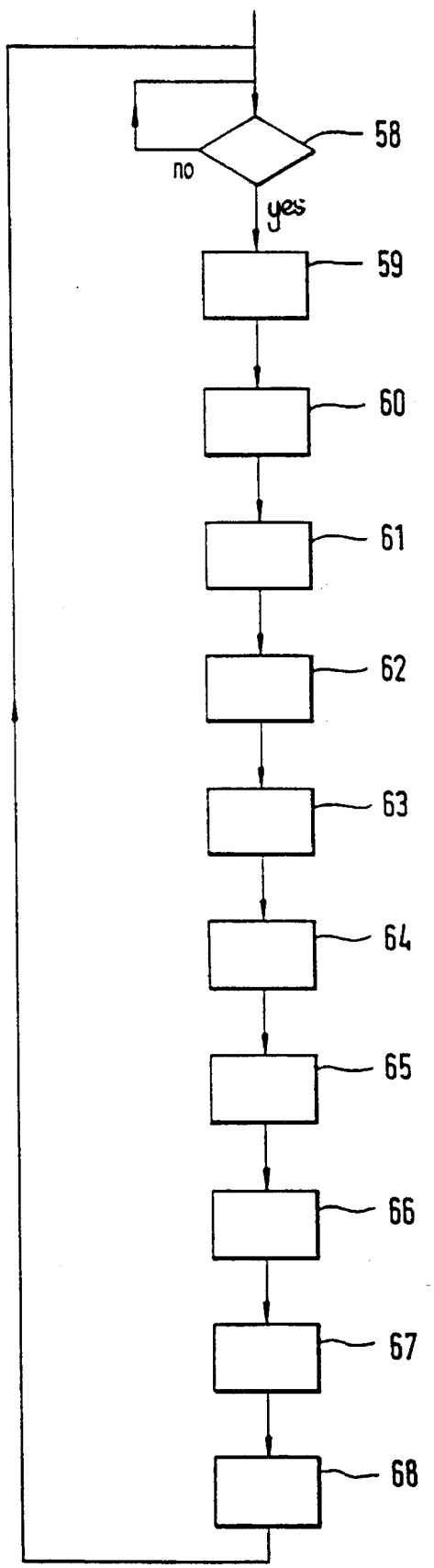
FIG. 5 is a flow chart depicting the operation of a fourth microprocessor in the first embodiment of the present invention.
Figure 6A:
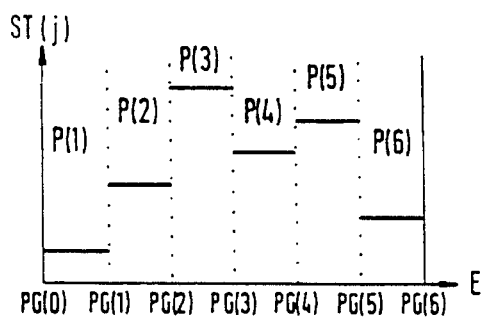
FIGS. 6a–6i schematically represent a method for determining the adaptive quantization.

The flow chart of FIG. 5 describes the operation of the microprocessor 4. At block 58, the microprocessor 4 waits for the signal S3 from the microprocessor 1. After receiving the signal S3, the cut-off frequency for a low-pass filtering of a density-estimate function, such as that depicted in FIG. 6a, is determined at block 59 by the microprocessor 4. The method for determining the cut-off frequency is discussed immediately below.

The density estimates ST(j) of the partitions P2(j) of the second quantization appear as a stepwise function over the range of input values (see FIG. 6a). To obtain a continuous function, which is necessary to determine the quantization of the range of input values with small partitions in the areas of large density fluctuations and large partitions in the areas of small density fluctuations, the stepwise function must be low-pass filtered over the entire range of input values.

To determine the optimal low-pass cut-off frequency, the density estimates of the individual partitions P2 of the second quantization Q2, which are stored in the storage device 10, are low-pass filtered, at first, with a high cut-off frequency. The mean square deviation of the filtered density estimate from the average density estimate of the partition, i.e., the variance, is estimated for each partition P2(j). The largest variance of all the partitions is determined by the microprocessor 4 and compared to a predetermined limiting value Do. The frequency is reduced incrementally, until the maximum variance of the filtered density estimates is less than or equal to Do.

Figures 6B, 6F:
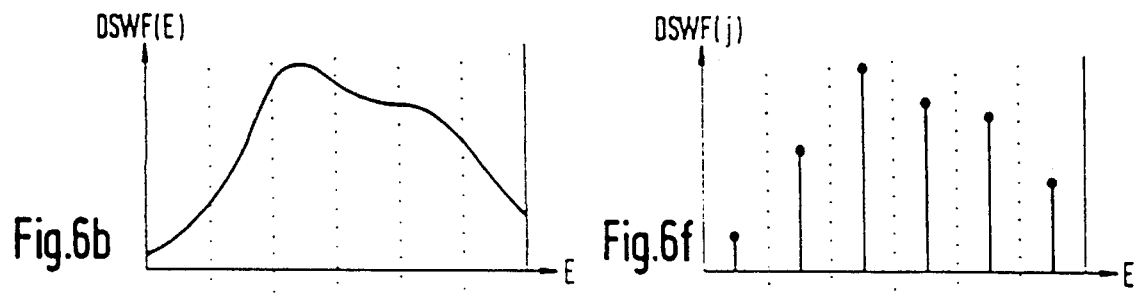
Figures 6C, 6G:
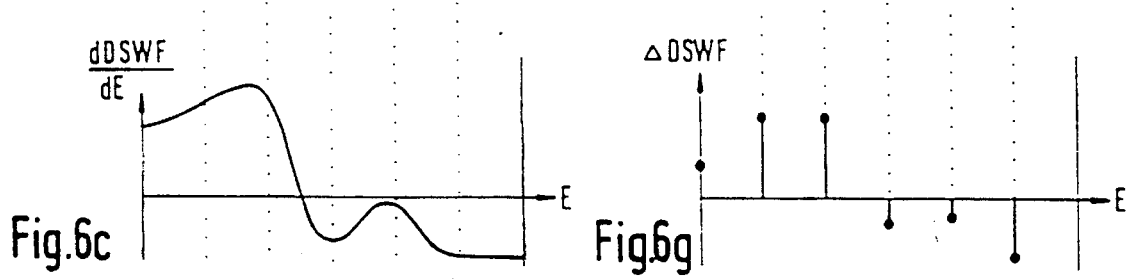

At block 60, the cut-off frequency fo determined above is used by a low-pass filter 11 to filter the density estimates ST(j) (FIG. 6a), stored in the storage device 10, at many points, with the spacing between points being smaller than the smallest partition width. The filtered function is an approximation of a continuous function DSWF(E) (FIG. 6b). After filtering, a subtraction operation is performed, at block 61, on the density-estimate function DSWF(E). In performing the subtraction operation, the density estimates of successive input values are subtracted from one another for the entire range of input values, and the difference is plotted over the larger input value. The subtraction operation is carried out over the entire input range, so that the difference in the density estimates of successive input values is plotted over the range of input values. In lieu of the subtraction operation, the derivative of the function DSWF(E) can preferably be derived over the range of input values E, as depicted in FIG. 6c.

Figures 6D, 6H:
Figure 6E:
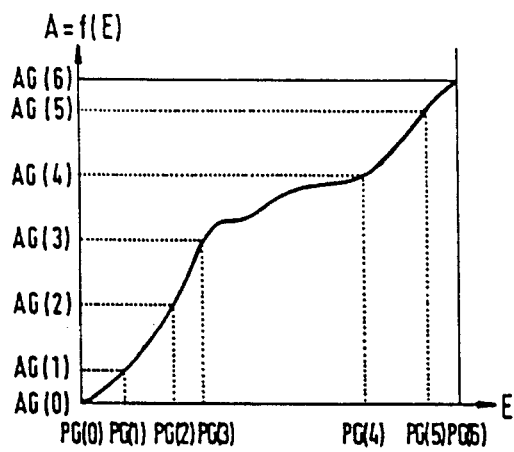

At block 62, an absolute-value generation is performed (see FIG. 6d), followed by a summation of the absolute values at block 63. The mapping function A=f(E), depicted in FIG. 6e, is obtained in this manner. The mapping function can optionally undergo a low-pass filtering once more, depending on how much of a stepwise shape it has.

There is an alternative approach for arriving at the mapping function A from the estimated values ST(j). The estimated-value function, which is formulated from the estimated values ST(j), is filtered at the partition midpoints. For m partitions, there are exactly m filtered values DSWF(j) (see FIG. 6f). Adjacent function values are subtracted from one another (FIG. 6g), and the absolute values of the resultant values are then determined (FIG. 6h). The absolute values are then summed and subjected to a second low-pass filtering. This second low-pass filtering is necessary to attain a continuous mapping function A (FIG. 6i), which is used to define the new partitions.

In lieu of an absolute-value generation, both of the above methods can preferably use a squaring operation, with a subsequent summation and calculation of the square root to attain the mapping function.

Figure 6I:
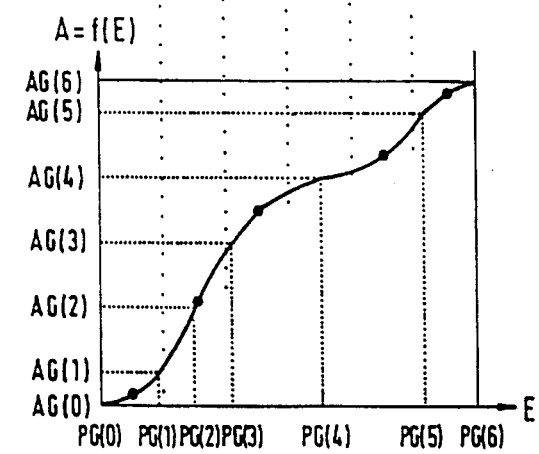

When plotted over the range of input values, the determined mapping function A=f(E) has a range of function values which, at block 64, is normalized to one. At block 65, the range of function values is divided into a fixed number of sub-ranges. The bottom and uppermost sub-ranges are preferably selected to be half as large as the remaining sub-ranges. The number of sub-ranges is equal to the number of partitions m. The zero range boundary AG(0) is assigned the value zero and the subsequent range boundaries AG(j) are defined as follows:

$$AG(j)=(j-\tfrac{1}{2})/(m-1),$$

with j running from 1 to m (see FIGS. 6e, 6i). Using the inverse function E=f$^{-1}$(A), the boundaries of the sub-ranges of function values are translated, at block 66, to the range of input values. Consequently, the size V(j) of the partitions P2(j) is re-established for the range of input values; i.e., a new quantization is determined for the range of input values. At block 67, the new, second quantization Q2 of the range of input values is then stored in the storage device 8. At block 68, a signal S3 is subsequently sent by the microprocessor 4 to the microprocessor 1. Operation of the microprocessor 4 then returns to block 58.

FIG. 6a depicts a histogram on which the input values E are plotted on the x-axis (abscissa) and the density estimates ST(j) on the y-axis (ordinate). In this example, the range of input values is subdivided into six equally stepped partitions, each partition P(j) being formed by a partition boundary PG(j−1) and a partition boundary PG(j). Thus, the partition P(1) is delimited, for example, by the partition boundaries PG(0) and PG(1). In the histogram of FIG. 6a, the density estimates ST(j) of the partitions P(j) are plotted over the range of input values. Since the density estimate is constant for each partition, a stepwise function for density estimates results over the range of input values.

FIG. 6b shows the histogram of FIG. 6a after it has been low-pass filtered. A continuous density-estimate function DSWF is thus produced from a stepwise function.

FIG. 6c shows the derivative of the density-estimate function of FIG. 6b, i.e., dDSWF/dE, over the range of input values. FIG. 6d shows the absolute-value |dDSWF/dE| of the function of FIG. 6c. FIG. 6e shows the mapping function A=f(E), which results from the summation, or the integration of the absolute-value function |dDSWF/dE| of FIG. 6d.

FIG. 6f shows the density estimates ST(j) after a low-pass filtering undertaken only at the partition midpoints. FIG. 6g shows the differences between adjacent values depicted in FIG. 6f, in which case the difference in the density estimates of adjacent input values is plotted in the center between the input values.

FIG. 6h shows the absolute values of the differences shown in FIG. 6g. FIG. 6i depicts the mapping function obtained by summing the differences indicated in FIG. 6h and by subsequently scaling them. The sub-range boundaries AG(j) are plotted on the y-axis, with the dotted line indicating the mapping correspondence $E=f^{-1}(A)$, with which the sub-range boundaries AG(j) in the range of function values are mapped on to the partition boundaries PG(j) in the range of input values.

The new quantization of the range of input values is obtained by normalizing the mapping function A=f(E) (FIGS. 6e and 6i) over the range of input values E, dividing it into segments, and translating the segments via the inverse function $E=f^{-1}(A)$ to the range of input values. Thus, for example, the division A(1) of the mapping function A, formed by the partition boundaries AG(0) and AG(1), is translated by translating the partition boundary AG(O) to the partition boundary PG(O) of the range of input values, and the partition boundary AG(1), to the partition boundary PG(1). PG(0) and PG(1) are computed using the relationship, $PG(j)=f^{-1}(AG(j))$. The partition A(1) of the mapping function A=f(E) is mapped in this manner on to the partition P(1) of the range of input values.

The method of the present invention will be described below, with reference to FIGS. 1–6, in the case where a variably tinted workpiece surface is sampled.

When the workpiece is sampled, gray values are measured by an optical sensor and relayed as input values to the interface 12. The microprocessor 1 transmits a signal S1 to the microprocessors 2 and 3. These microprocessors read-in, via the interface 12, a fixed number n of different gray values of the workpiece sampled. The microprocessor 2 assigns the gray values to the partitions Pi(j) of the first quantization Q1, of the range of gray values in the storage device 5, and outputs the corresponding density estimates ST(j), stored in the storage device 6 under the table of estimated values ST, via the interface 13 for further processing.

After processing the input values, the microprocessor 2 transmits the signal S1 to the microprocessor 1. Simultaneously with the microprocessor 2, the microprocessor 3 assigns the gray values to the partitions P2 of a second quantization Q2 in the storage device 8 and for each assignment, increases the count value H(j), stored in the storage device 9, corresponding to the partition P2(j). After processing all read-in input values E pertaining to the workpiece, the microprocessor 3 transmits the signal S1 to the microprocessor 1.

After receiving the signal S1 from the microprocessors 2 and 3, the microprocessor 1 sends a signal S2 to the microprocessor 3. After receiving the signal S2, the microprocessor 3 determines the density estimates ST(j) of the partitions P2(j) of the second quantization Q2. For this purpose, the count values H(j) of the partitions P2(j) are divided by the size V(j), where V(j)=PG2(j)–PG2(j–1), of the partition P2(j) in question and by the number n of assigned input values E. The calculated density values ST(j) are stored in the table of estimated values ST in the storage device 6 and in the storage device 10, and the old estimated values are erased. The first quantization Q1 in the storage device 5 is erased by the microprocessor 3, and the second quantization Q2 is stored by the microprocessor 3 in the storage device 5 as the new first quantization Q1. After that, the microprocessor 3 transmits the signal S2 to the microprocessor 1.

After receiving the signal S2 from the microprocessor 3, the microprocessor 1 transmits a signal S3 to the microprocessor 4. The microprocessor 4 then determines the cut-off frequency fo for the low-pass filtering of the density estimates ST(j) by minimizing the variance of the density-estimate function. The microprocessor 4 obtains the density estimates ST(j) from the storage device 10 and filters them with the help of the low-pass filter 11 using a high cut-off frequency (i.e., moderate filtering).

The microprocessor 4 then determines the maximum variance D of the filtered density-estimate function, and compares it against a predetermined value Do. The variance represents the statistical fluctuations in the estimated values, which are generated when the range of input values is divided into partitions. Decreasing the filter cut-off frequency will result in a reduced variance, but the additional smoothing of the density estimates also causes loss of information. If the maximum variance in the density-estimate function is greater than the predetermined value Do, the cut-off frequency is reduced and the density estimates ST(j) are once again obtained from the storage device 10 and filtered. This process is repeated until the maximum variance D of the filtered density estimates DSWF(E) is smaller than the predetermined value Do.

The steps described above can be modified by determining the variance only at the partition midpoints (see FIG. 6f). Functions for estimating variances in such a case are well known. See J. O. Berger, "Statistical Decision Theory and Bayesian Analysis", 2nd ed., Springer, N.Y., 1985. For example, the following equations can be applied:

$$s_i^2 = \frac{1}{m} \left[ \sum_{j=1}^{m} \frac{ST(j)}{V(j)} n_j^2 - \left( \sum_{j=1}^{m} ST(j) n_j \right)^2 \right]$$

$$n_j = \int_{PG(j-1)}^{PG(j)} K(x_j - p) \, dp_i$$

$$x_j = \frac{PG(j) + PG(j-1)}{2} i$$

where n is the total number of input values E read-in, m is the number of partitions of the quantization, $s_i^2$ is the variance estimate in partition i (where i=1...m), ST(j), V(j), PG(j) and $x_j$ are the density estimate, the size, the upper boundary and the midpoint of the partition j (where j=1... m), and K(x) is the pulse response of the low-pass filter 11. The maximum variance D is determined from the m variances $s_i^2$ and compared to the permissible variance Do.

The density estimates ST(j) (FIG. 6a) of the partitions P2 of the second quantization Q2, stored in the storage device 10, are filtered at the partition midpoints (see FIG. 6f) using the cut-off frequency fo determined by the steps described above. Thus, a density-estimate function is obtained, which is represented by the series of filtered density estimates DSWF(j) (FIG. 6f). The filtered density-estimate function then undergoes a subtraction operation (FIG. 6g), an absolute-value generation (FIG. 6h), and a summation, and is thus converted into a monotonically rising discrete-time function.

Through repeated filtering using the low-pass filter 11, with a cut-off frequency that is preferably the same as the frequency fo previously used, the monotonically rising discrete-time function is converted into a continuous, monotonically rising mapping function A=f(E) (FIG. 6i). In this manner, the rising and falling edges of the density-estimate function are converted into rising edges of the mapping function A=f(E).

The function range of the function A=f(E) is normalized to 1 and divided into sub-ranges (compare FIG. 6i). The subdivision of the function range is translated by way of the inverse function $E=f^{-1}(A)$ to the range of input values and, in this manner, a new, second quantization Q2 of the range of input values is determined. This mapping method assigns small partitions of the range of input values to areas of large density fluctuations and large partitions of the range of input values to areas of small density fluctuations. As a result, the second quantization Q2, that had been valid until this point, is erased from the storage device 8, and the new, second quantization is stored as a second quantization Q2 in the storage device 8. The microprocessor 4 then transmits a signal S3 to the microprocessor 1, and operation starts again from the beginning.

Figure 7:
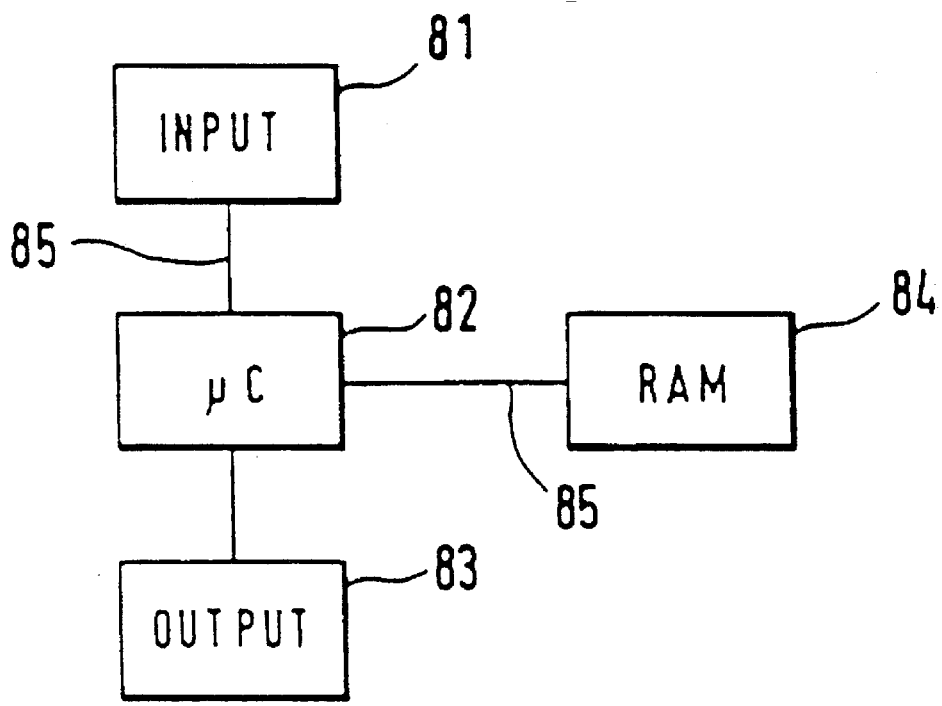
FIG. 7 is a schematic representation of a circuit arrangement for a second embodiment of the present invention.

FIG. 7 shows a block diagram of a second embodiment of the present invention. The second embodiment comprises an input interface 81, a processing unit 82, an output interface 83, a storage device 84, and data lines 85. Operation of the embodiment of FIG. 7 will be described with reference to the flow charts of FIGS. 8 through 15.

Figure 8:
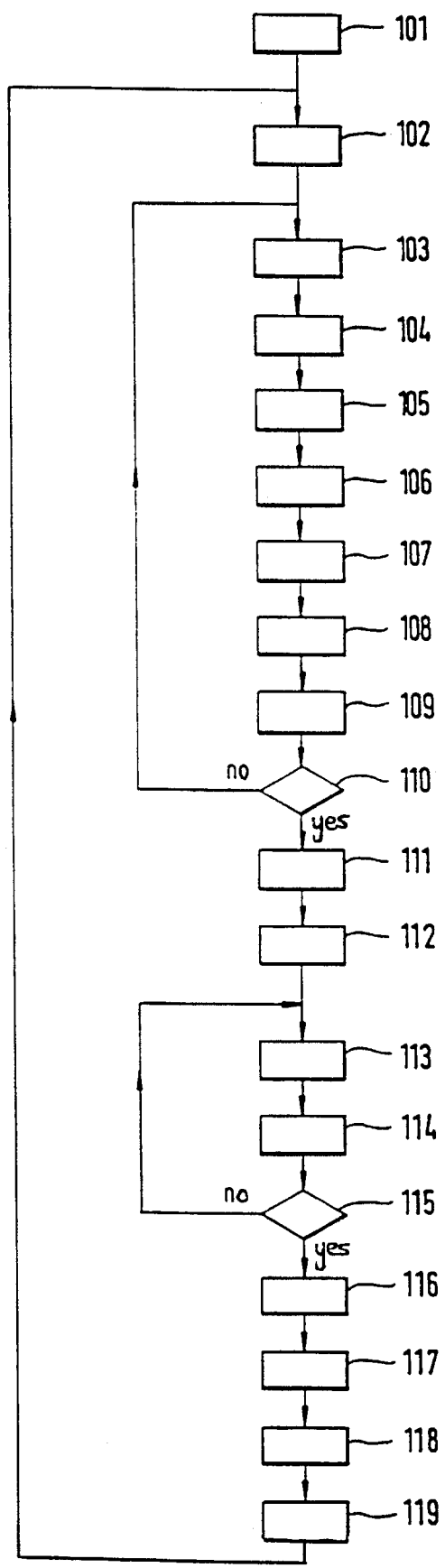
FIG. 8 is a flow chart depicting the operation of a microprocessor in the second embodiment of the present invention.
Figure 9:
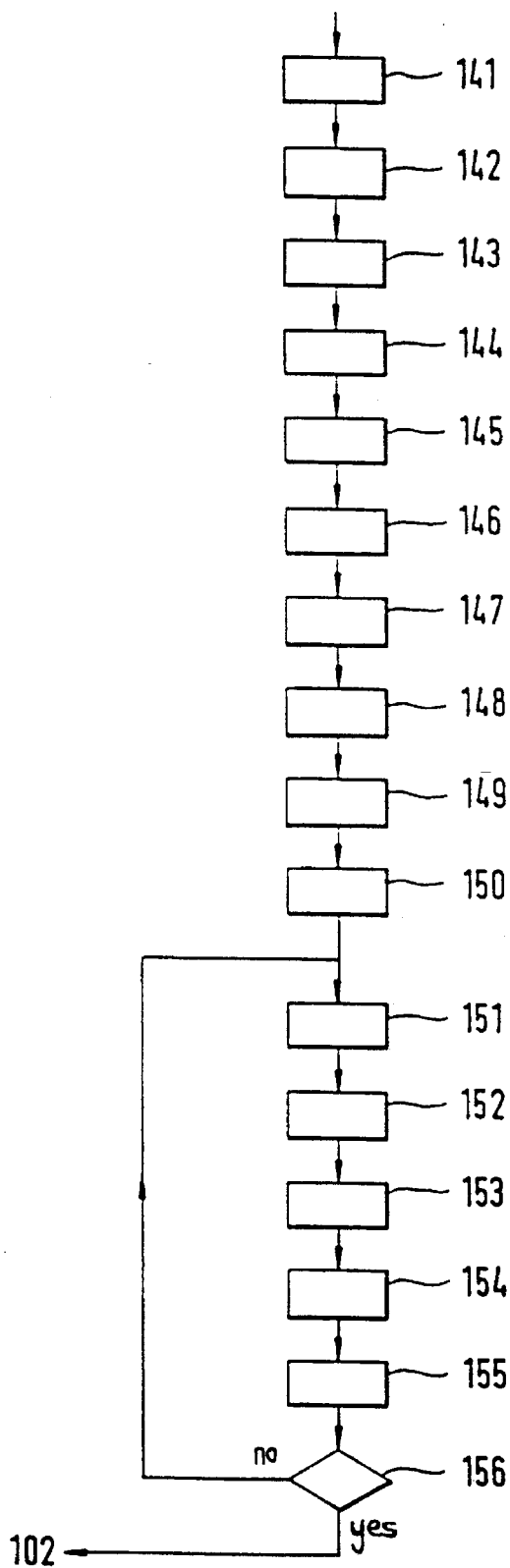
FIG. 9 is a flow chart for implementing an initialization of a first quantization, a second quantization, an estimated value table, and a count table.
Figure 10:
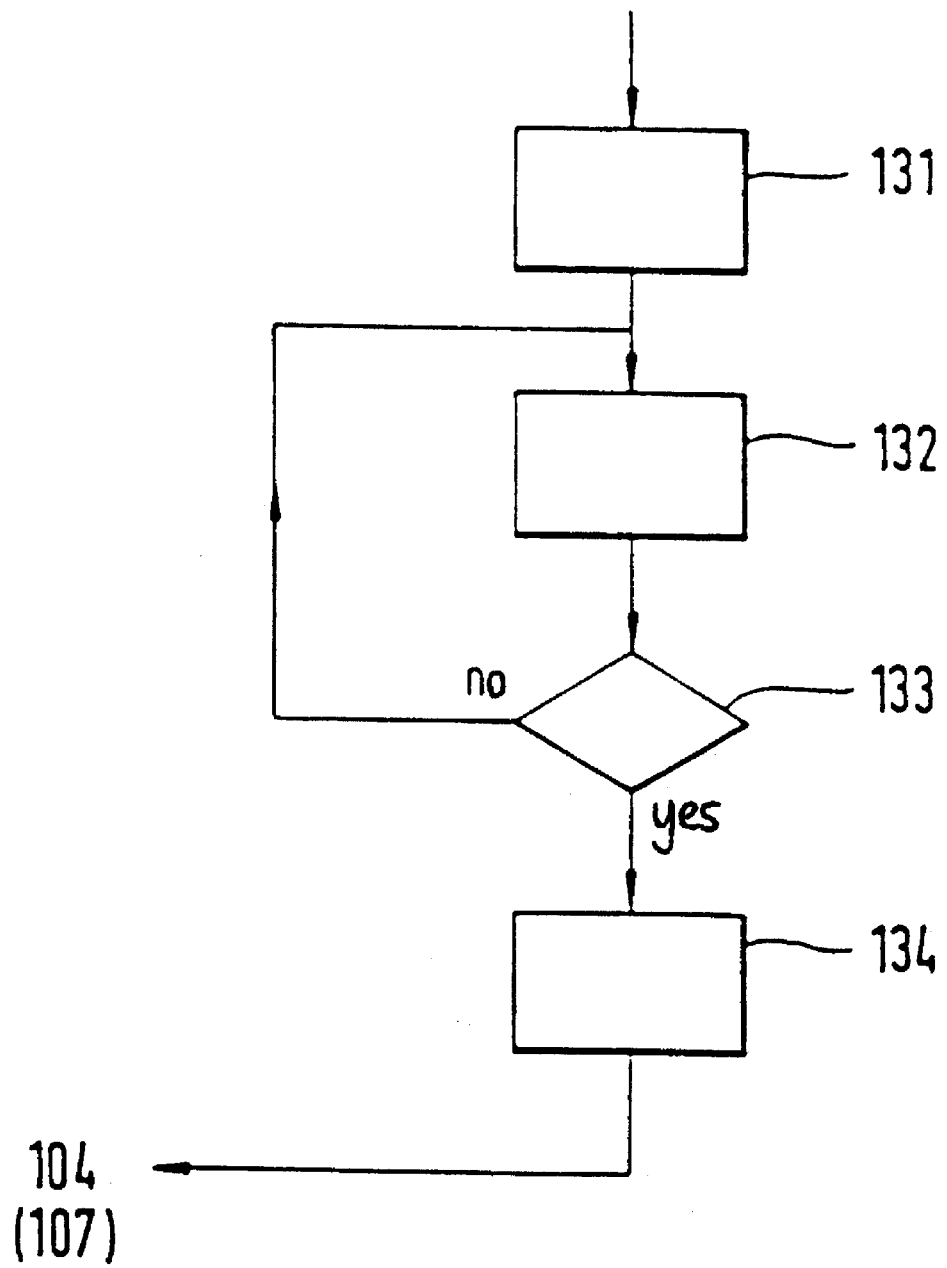
FIG. 10 is a flow chart depicting the assigning of an input value to a partition of a quantization of a range of input values.
Figure 11:
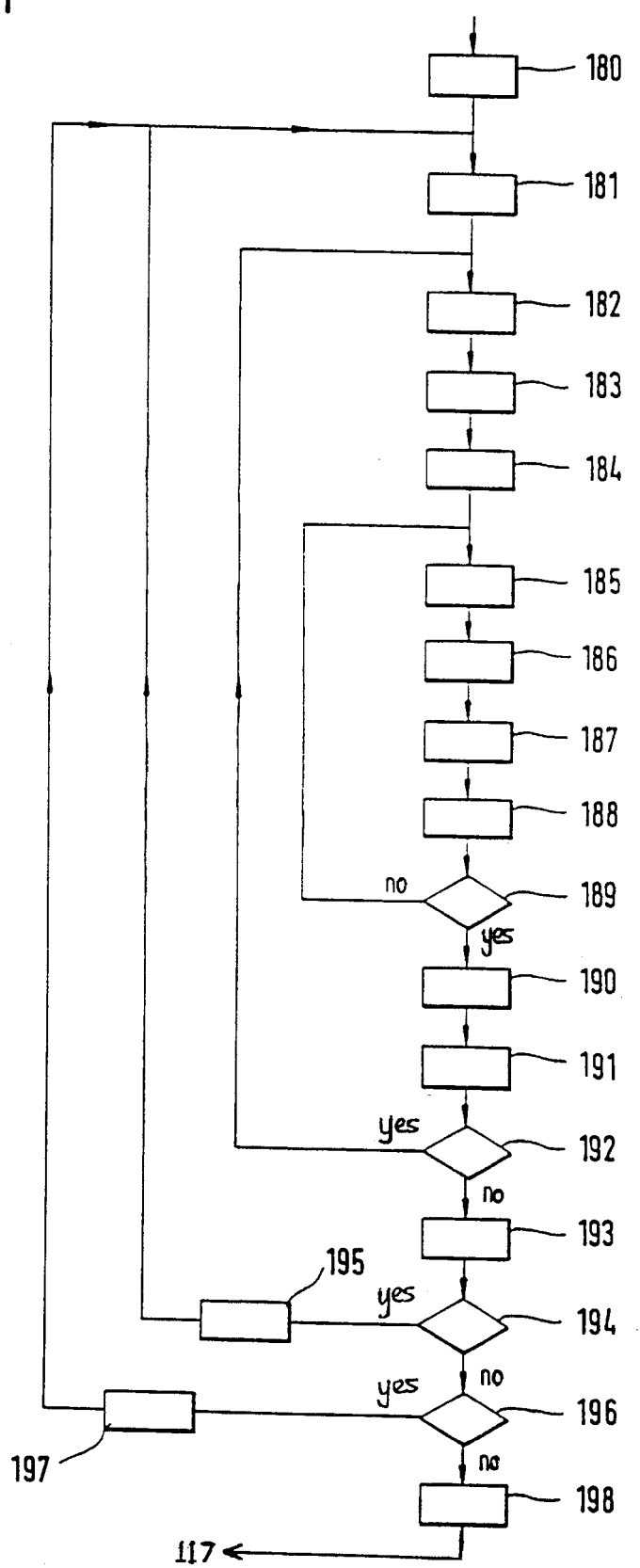
FIG. 11 is a flow chart depicting the determination of a low-pass filtering cut-off frequency.
Figure 12:
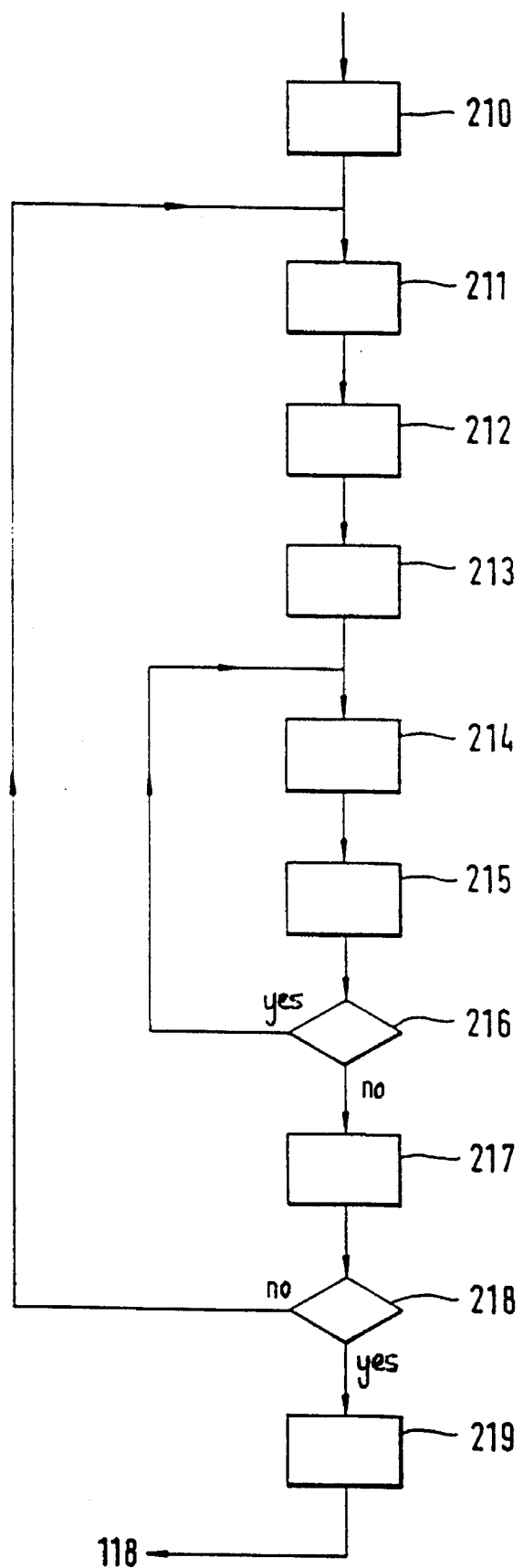
FIG. 12 is a flow chart depicting the low-pass filtering of the density estimates of the partitions of a quantization.
Figure 13:
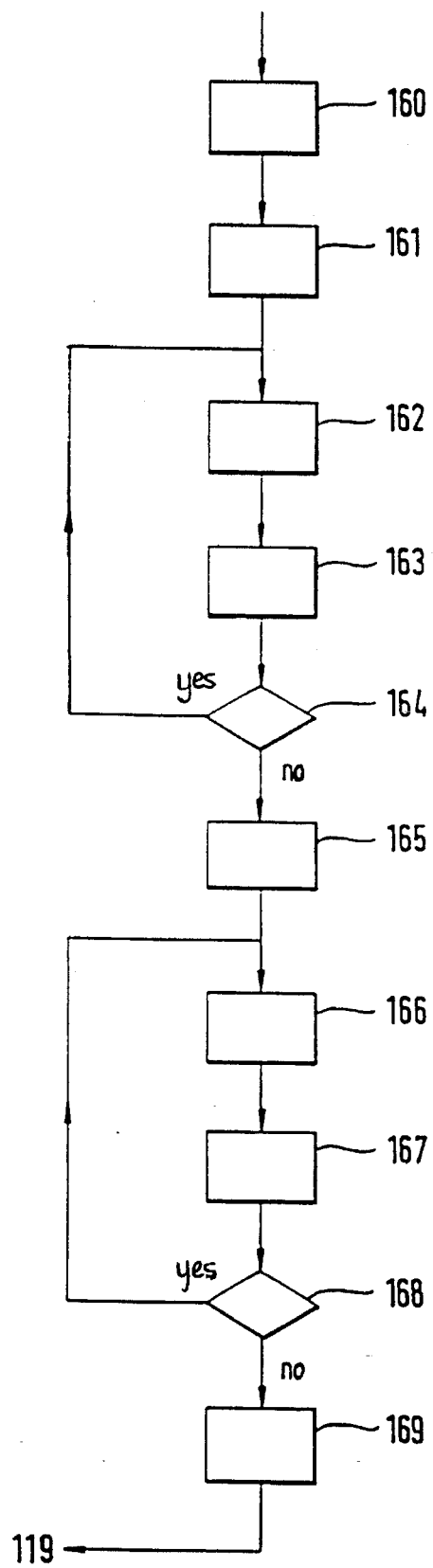
FIG. 13 is a flow chart depicting the monotonizing of a density-estimate function.
Figure 14:
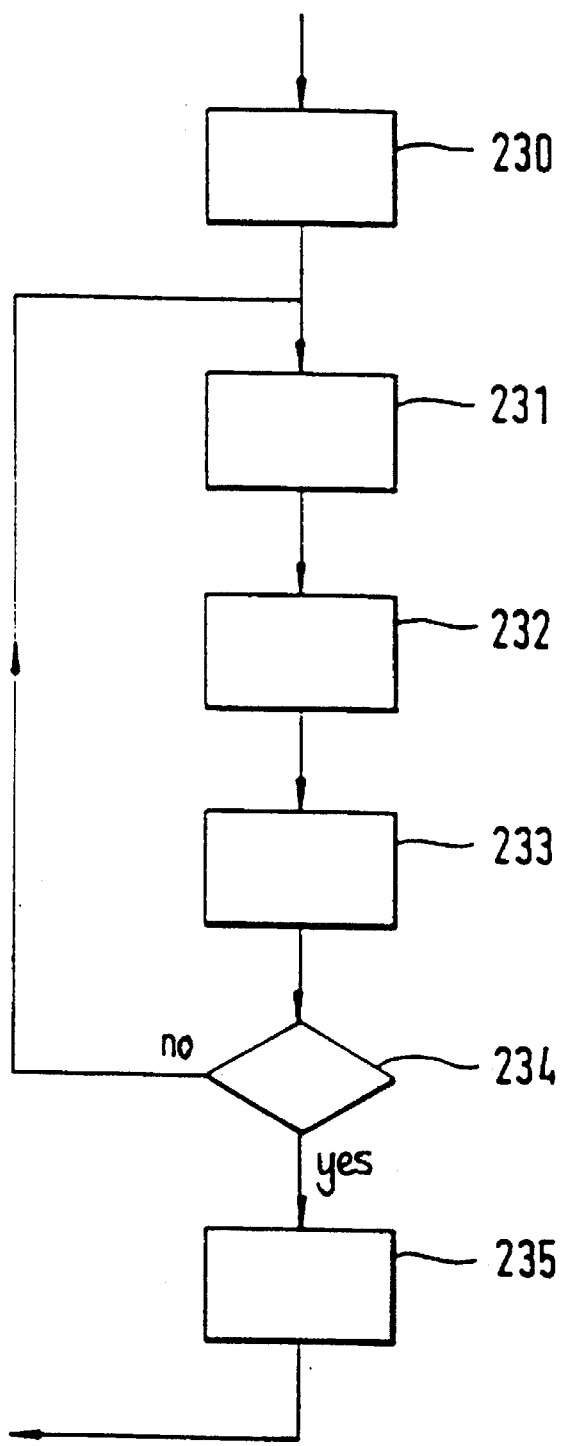
FIG. 14 is a flow chart depicting the determination of a new quantization of the range of input values.
Figure 15:
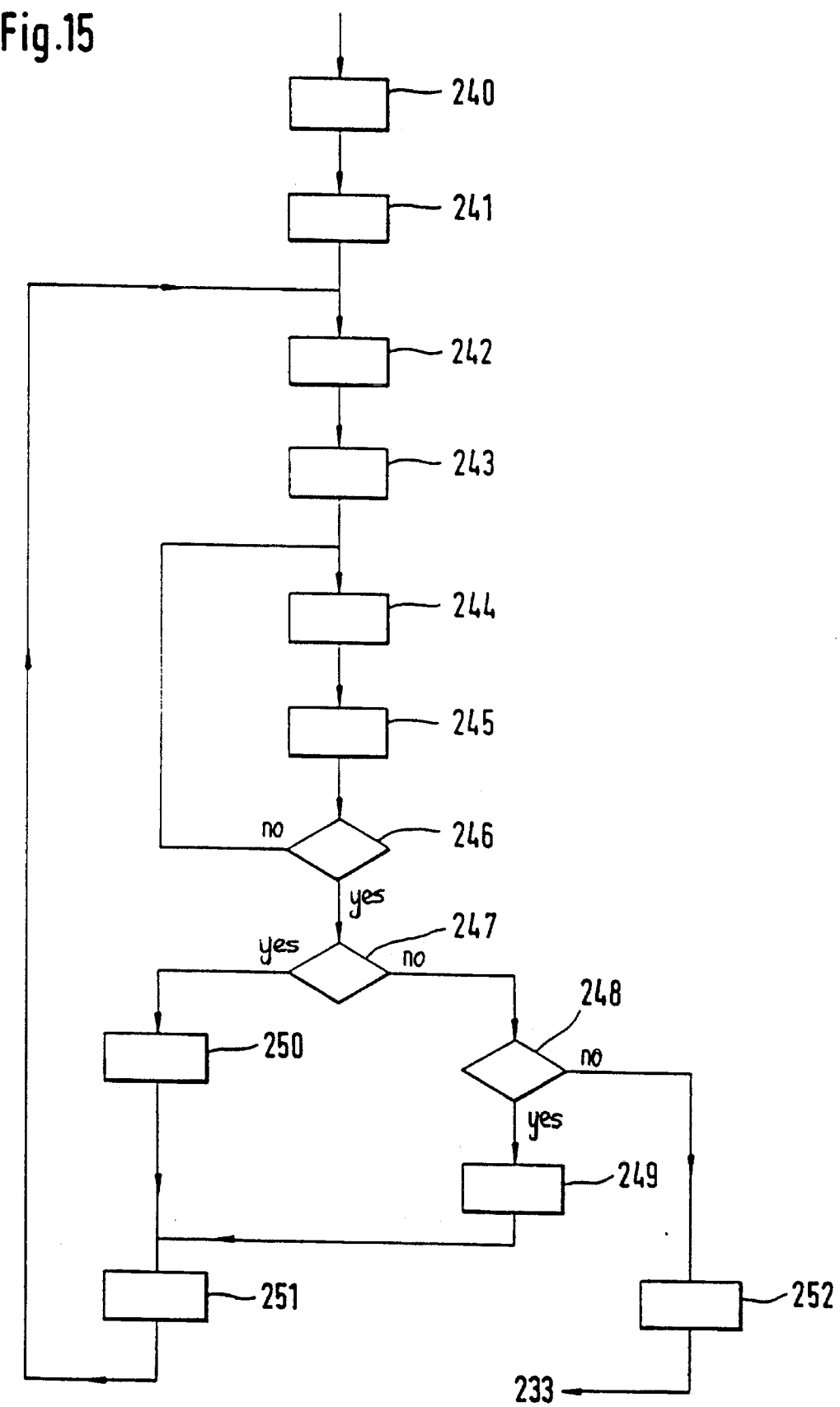
FIG. 15 is a flow chart depicting the determination of an inverse function for the new quantization.

FIG. 8 shows an overview of the described histogram method for estimating distribution density. FIG. 9 depicts the initialization of the applied variables, tables and constants. FIG. 10 depicts the process for assigning input values E to partitions of a quantization. FIG. 11 illustrates how the cut-off frequency is determined for the low-pass filtering. FIG. 12 describes the low-pass filtering. FIG. 13 illustrates the monotonization of the density-estimate function. FIG. 14 shows how the partitions of the new quantization are defined and FIG. 15 shows how an inverse function is formulated from the mapping function determined from density estimates.

The first quantization Q1, the second quantization Q2, the estimated-value table ST, the count table H, and the number of partitions are initialized at block 101 in FIG. 8 in accordance with the flow chart of FIG. 9. A controlled variable i is set to one at block 102. Then, at block 103, the processing unit 82 reads-in an input value E via the interface 81. At block 104, the input value read-in is assigned, in accordance with its value, to a partition P1(j) of the quantization Q1. The assignment of input values to partitions proceeds in accordance with the flow chart of FIG. 10.

A density estimate ST(j) for each partition Pi(j) of the quantization Q1, is stored in a table of density estimates ST in the storage device 84. A variable j indexes the density estimate ST(j) and the corresponding partition Pi(j). At block 105, the density estimate ST(j) corresponding to the partition Pi(j) to which the input value was assigned, is read out of the storage device 84 by the processing unit 82 and output at block 106 via the second interface 83 for further processing.

At block 107, the input value E read in at block 103 is then assigned to a partition P2(j) of the quantization Q2 in accordance with the flow chart of FIG. 10. For each partition P2(j), a count value H(j) representing the number of input values E assigned to each partition, is stored in the storage device 84. At block 108, the count value H(j) associated with the partition to which the input value is assigned, is incremented by one. At block 109, the variable i is incremented by one. A comparison follows at block 110 to determine whether the variable i is greater than or equal to the predetermined number n of input values E to be read-in. If not, operation returns to block 103 and runs repeatedly through blocks 103–109 until the variable i is greater than or equal to the number n, at which point operation branches to block 111 where the variable j is set to one. Subsequently, at block 112, the quantization Q1 is replaced by the quantization Q2 in the storage device 84.

At block 113, the processing unit 82 determines the estimated-value table ST from the count values H(j) of the quantization Q2. The estimated value ST(j) of the partition P2(j) is determined from the number of input values E read-in n, the count value H(j), and the size V2(j) of the partition P2(j), as follows:

$$ST(j)=H(j)/[V2(j)*n],$$

where V2(j)=PG2(j)–PG2(j–1). The variable j is incremented by one at block 114 and a comparison follows at block 115 to determine whether the variable j is greater than or equal to the number n. If not, blocks 113 and 114 are run through repeatedly until the variable j is greater than n, at which point operation branches to block 116.

At block 116, the value of the filter cut-off frequency fo is determined in accordance with the flow chart of FIG. 11. Low-pass filtering of the density estimates ST(j), stored in the table of estimated values ST, follows at block 117, in accordance with the flow chart of FIG. 12. At block 118, the filtered density estimates are monotonized in accordance with the flow chart of FIG. 13, and the new quantization Q2 is determined at block 119 in accordance with the flow chart of FIG. 14. Once the new quantization Q2 is determined, operation returns to block 102, and is repeated with new input values E.

FIG. 9 illustrates the operating sequence involved in the initialization (at block 101 of FIG. 8) of the first quantization Q1, the second quantization Q2, the table of density estimates ST, and the count table H. At block 141, a value from the storage device 84, representing the smallest possible input value, is assigned to a bottom boundary xo of the range of input values. At block 142, a value from the storage device 84, representing the largest possible input value, is assigned to the upper boundary xm of the range of input values. At block 143, a value from the storage device 84 is assigned as an initial value to the filter cut-off frequency fo. At block 144, the number of partitions m is read from the storage device 84. At block 145, the threshold value Do for the maximum density-estimate variance is read from the storage device 84. At block 46, a threshold value U for the maximum function-value error is read from the storage device 84.

The value of the lower boundary xo of the range of input values is assigned at block 147 to the first partition boundary PG1(0) of the quantization Q1 and, at block 148, to the first partition boundary PG2(0) of the quantization Q2. At block 149, the size V of a partition P(j) is determined as follows:

$$V=(xm-xo)/m,$$

where xm is the upper boundary of the range of input values, xo is the lower boundary of the range of input values and m is the number of partitions P(j). At block 150, the variable j is set to one. At block 151, the boundaries PG1(j) of the partitions P1(j) of the first quantization Q1 are established, with PG1(j)=j*V. At block 152, the boundaries PG2(j) of the partitions P2(j) of the second quantization Q2 are determined, with PG2(j)=j*V.

At block 153, the j-th value in the table of estimated values ST is reset to zero; i.e., ST(j)=0. At block 154, the j-th value in the count table H is reset to zero; i.e., H(j)=0. At the subsequent block 155, the variable j is incremented by one. If it is determined, as a result of a comparison at block 156, that the variable j is not greater than the number of partitions m, then blocks 151–155 are run through repeatedly, until j is greater than or equal to m, at which point operation branches off to block 102 (FIG. 8). All estimated values ST(j) and all count values H(j) are then reset to zero.

FIG. 10 describes how the input values E are assigned to the partitions of the quantizations Q1 and Q2 of the range of input values, as is done at blocks 104 and 107 (FIG. 8), respectively. The variable j is reset to zero at block 131 and incremented by one at block 132. A comparison follows at block 133 to determine whether the input value E is greater than the value of the partition boundary PG1(j) of the first quantization Q1, in the case of block 104, or PG2(j) of the second quantization Q2, in the case of block 107. If not, operation branches to block 132, and repeatedly runs through blocks 132 and 133 until the partition within which the input value E falls is determined. At block 134, the value of the variable j of the partition in which the input value E falls, is stored in the storage device 84. Operation then branches back to block 104 or 107 in the flow chart of FIG. 8.

FIG. 11 describes how a cut-off frequency is determined at block 116 (FIG. 8) for the low-pass filtering of the density estimates. At block 180, the filter frequency f is assigned a default value. At block 181, the variable j is set to one and at block 182, variables V1 and V2 are reset to zero. At block 183, the partition midpoint x(j) of the j-th partition P2(j) of the quantization Q2 is determined as follows:

$$x(j)=(PG2(j)+PG2(j-1))/2.$$

At block 184, the controlled variable i is set to one.

At block 185, the size V(i) of the i-th partition P2(i), which is formed by the partition boundaries PG2(i) and PG2(i−1), is determined as follows:

$$V(i)=PG2(i)-PG2(i-1).$$

The variable V1 is determined at block 186, as follows:

$$V1=V1+ST(i)*(ETA(x,f,PG2(i),PG2(i-1))^2/V(i).$$

The variable V2 is determined at block 187, as follows:

$$V2=V2+ST(i)*ETA(x, f, PG2(j), PG2(j-1)).$$

The function ETA(x,f,PG2(i),PG2(i−1)) represents the following integral:

$$ETA(x,f,PG2(i),PG2(i-1)) = \int_{PG2(i-1)}^{PG2(i)} K(f,x-p)dp.$$

For a linear low-pass filter having the pulse response K(f,x) and the cut-off frequency f:

$$K(f,x) = \begin{cases} f*(1+\cos(2\pi fx)) & \text{, when } |x| < 1/2f; \\ 0 & \text{, when } |x| > 1/2f; \end{cases}$$

The variable i is incremented by one at block 188. A comparison follows at block 189 to determine whether the variable i is greater than the number of partitions m. If not, operation returns to block 185, and blocks 185–189 are repeated until the variable i is greater than the number of partitions m, at which point operation branches to block 190. The variance of the partition P2(j) is determined at block 190, as follows:

$$VAR(P2(j))=(V1-V2^2)/n,$$

where n is the number of input values E read-in. The variable j is incremented by one at block 191. If it is determined, as a result of a comparison at block 192, that the variable j is smaller than the number of partitions m, then operation returns to block 182. Blocks 182–192 are run through repeatedly, until j equals m, at which point operation branches to block 193.

D, the largest variance of those determined for each partition P2(j), is determined at block 193, as follows:

$$D=max(VAR(P2(i))),$$

where i runs from one through m. At block 194, the maximum variance D is compared to the threshold value Do for the maximum variance of a density estimate. If the maximum variance D is greater than Do, the frequency f is lowered by an amount df1 at block 195, and operation returns to block 181 and runs repeatedly through blocks 181–194. If, however, it is determined as a result of the comparison at block 194 that the maximum variance D is smaller than or equal to Do, then operation branches to block 196. If it is determined as a result of a comparison at block 196 that the maximum variance D is smaller than (Do-to), to being a constant, operation then branches to block 197, where the frequency f is increased by an amount df2. Operation then returns to block 181.

If, however, at block 196 it is determined that the maximum variance D is smaller than or equal to (Do-to), operation then branches to block 198. The frequency fo thus determined is stored in the storage device 84 and used in the subsequent low-pass filtering of the density estimates. Finally, operation branches to block 117 in the flow chart of FIG. 8.

FIG. 12 describes how the density estimate values ST(j), which are stored in the table ST in the storage device 84, are filtered at block 117. First, the variable j is set to one at block 210. At block 211, the j-th filtered density estimate DSWF(j) of the partition P2(j) is reset to zero. At block 212, the midpoint x(j) of the partition P2(j) of the quantization Q2 is determined, as follows:

$$x(j)=(PG2(j)+PG2(j-1))/2.$$

The variable i is set to one at block 213. At block 214, the value of the filtered density estimate FW(j) for the i-th partition P2(i) of the quantization Q2 is determined using the integral ETA, as follows:

$$DSWF(j)=DSWF(j)+ST(i)*ETA(x,f,PG2(i),PG2(i-1)),$$

and temporarily stored.

At block 215, the variable i is incremented by one. If it is determined at block 216 that the variable i is smaller than or equal to the number of partitions m, operation returns to block 214. If it is determined at block 216 that the variable i is greater than m, then the variable j is incremented by one at block 217, followed by a comparison at block 218 to determine whether the variable j is greater than m. If j is not greater than m, operation returns to block 211 and blocks 211–218 are repeated until the variable j is greater than m, at which point the filtered density estimates DSWF(j) are stored, at block 219, as a density-estimate function in the storage device 84, and operation branches back to block 118.

FIG. 13 depicts a subtraction operation, an absolute-value generation, a summation, i.e., a monotonization, and subsequently a normalization of one of the filtered density estimates DSWF(j). At block 160, the value zero is assigned to a monotonized density estimate MW(0). At block 161, the variable j is set to one. At block 162, MW(j) is determined as follows:

$$MW(j)=MW(j-1)+|DSWF-DSWF(j-1)|,$$

where DSWF(j) represents the filtered density estimates. This step comprises the subtraction of adjacent filtered density estimates FW(j), as shown in FIG. 6g, the absolute-value generation, as shown in FIG. 6h, and the summing operation, as shown in FIG. 6i. At block 163, the variable j is incremented by one, and at block 164, j is compared to the number of partitions m. If j is smaller than or equal to m, operation branches to block 162. Blocks 162–164 are repeated until j is greater than m, at which point operation branches to block 165. The monotonization is carried out for all m partitions.

At block 165, the variable j is set to one and at block 166, the monotonized density estimates MW(j) are normalized to one as follows:

$$MW(j)=MW(j)/MW(m).$$

At block 167, the variable j is incremented by one and if, as a result of a comparison at block 168, it is determined that j is smaller than or equal to the total number of partitions m, operation returns to block 166. Blocks 166–168 are repeated until j is greater than m, i.e., the monotonized density estimates MW(j) of all m partitions have been normalized to one, at which point operation branches to block 169. At block 169, the normalized and monotonized density estimates MW(j) (for j =1...m) are stored in the storage device 84. The normalized and monotonized density estimates MW(j) establish the mapping function A, which is depicted in FIG. 6i. After that, operation branches back to block 119 (FIG. 8).

FIG. 14 describes how a new quantization Q2 of the range of input values is determined using the inverse function, $E=f^{-1}(A)$, of the mapping function $A=f(E)$. At block 230, the controlled variable j is set to one. At block 231, a variable y is calculated, as follows:

$$y=(j-\tfrac{1}{2})/(m-1),$$

where m is the number of partitions P2(j). At block 232, the partition boundary PG2(j) of the partition P2(j) of the new quantization Q2, is determined, in accordance with the flow chart of FIG. 15, using the variable y calculated above, the monotonized and normalized density estimates MW(j), the previously applied partition boundary PG2(j), and the filter cut-off frequency fo.

At block 233, the variable j is incremented by one, and at block 234 a comparison follows to determine whether the variable j is greater than the number of partitions m. If it is determined that j is not greater than m, operation returns to block 231. Blocks 231–234 are repeated until the variable j is greater than m, at which point operation branches to block 235 where the new quantization Q2 is stored in the storage device 84. After block 235, operation jumps back to block 102 (FIG. 8).

FIG. 15 describes how the new quantization Q2 is determined using the mapping function $A=f(E)$ and its inverse function, $E=f^{-1}(A)$. First, a variable z is determined at block 240, as follows:

$$z=(xo+xm)/2.$$

The variable z is used as an initial value in an iterative process which is more fully described immediately below.

An increment of the iteration, dz, is established at block 241, as follows:

$$dz=(xm-xo)/4.$$

At block 242, a variable yy is reset to zero and at block 243, the controlled variable j is set to one. At block 244, the variable yy is determined, as follows:

$$yy=yy+MW(j)*\ ETA(z,\ fo,\ PG2(j-1),\ PG2(j)).$$

At block 245, the variable j is incremented by one followed by a comparison at block 246 to determine whether the variable j is greater than the number of partitions m. If not, operation returns to block 244 and blocks 244–246 are repeated until the variable j is greater than m, at which point operation branches to block 247. At block 247, a comparison is made to determine whether the variable yy is smaller than the quantity y–U, where U is a predetermined threshold value for the maximum function-value error and y is determined, as described above, in accordance with the flow chart of FIG. 14. If yy is smaller than y–U, operation branches to block 250, where the variable z is increased by dz (i.e., z=z+dz). At block 251, the variable dz is then halved (i.e., dz=dz/2), after which operation returns to block 242.

If it is determined at block 247 that the variable yy is greater than y–U, operation branches to block 248. At block 248, a comparison is made to determine whether the variable yy is greater than y+U, and if it is, operation branches to block 249, where z is decreased by dz (i.e., z=z–dz). At block 251, the variable dz is then halved (i.e., dz=dz/2), after which operation returns to block 242. If it is determined at block 248 that the variable yy is not greater than y+U, operation then branches to block 252, where the value of z is treated as the value of the inverse mapping function, $E=f^{-1}(A)$, corresponding to the sub-range boundary AG(j); i.e., z represents the new partition boundary PG2(j) being sought. By this process, the sub-range boundaries AG(j) are mapped on to the new partition boundaries PG2(j). Once the new partition boundary has been assigned the value z, i.e., PG2(j)=z, operation branches to block 233 in the flow chart of FIG. 14.

Application of the present invention to the sampling of a variably tinted workpiece surface will be described below with reference to FIGS. 7 through 15.

At block 103 (FIG. 8), the computer 82 reads-in a gray value (input value E) recorded by a video camera via the first interface 81. At block 104, the computer 82, operating in accordance with the flow chart of FIG. 10, assigns the input value E to a partition Pi(j) of the first quantization Q1. At block 105, the computer 82 searches in the table of estimated values ST, stored in the storage device 84, for the density estimate ST(j) associated with the partition. The density estimate value thus obtained is output, at block 106, via the second interface 83.

For the same input value E, the computer 82 then determines, at block 107, the partition P2(j), of the second quantization Q2, in which the input value E falls, in accordance with the flow chart of FIG. 10. At block 108, the computer 82 increments the count value H(j) associated with the partition P2(j), in the storage device 84 and reads-in the next input value E at block 103. The computer 82 repeats this process for a predetermined number n of input values E. At block 112, after reading-in the n input values E, the computer 82 erases the partitions Pi(j) of the first quantization Q1 in the storage device 84, and stores the partitions P2(j) of the second quantization Q2 as new partitions Pi(j) of the first quantization Q1. The computer 82 resets the previously applied density estimate ST(j) to zero.

In an alternative embodiment, the density estimates ST(j) are not erased, but rather are used as estimates which are weighted by a factor that accounts for the overlapping of the previous and the new quantization Q2 and the degree of change in the quantization Q2.

At block 113, the computer 82 then calculates the density estimates ST(j)=H(j)/[n*V(j)] from the count values H(j), the size V(j) of the partitions P2(j), and the number n of input values E read-in. The computer 82 subsequently determines the optimal cut-off frequency for the low-pass filtering (see FIG. 11). For this purpose, the computer 82 reads the density estimates ST(j) out of the storage device 84, and filters them with a low cut-off frequency. The measure of good filtering is a low random noise of the estimated values, on the one hand, and a small deviation in the filtered density estimate from the average density estimate, on the other hand, which is expressed by the variance. A noise reduction is achieved by reducing the filter cut-off frequency. Given too small a cut-off frequency, however, the distribution of density estimates over the range of input values loses information because the distribution of density estimates is smoothed out too much.

To limit the loss of information, a limiting value Do is established for the variance of the filtered density estimates. To simplify the estimation, the computer 82 compares only the largest occurring variance D of all partitions to the limiting value Do. If the variance D of the filtered function is greater than the limiting value, the computer 82 again reads the density estimates ST(j) from the storage device 84 and filters them with a cut-off frequency that is lower than the preceding cut-off frequency by the increment df1.

If the maximum variance is smaller than the limiting value, less a constant to (i.e., D<Do-to), the filter cut-off frequency is incremented by a value df2, and the density estimates are filtered once more with the new frequency. This process is repeated until the largest variance D of the filtered density estimates is smaller than the limiting value Do and greater than (Do-to).

In an alternative embodiment, the variance is calculated only at the partition midpoints. The density estimates ST(j) are filtered with the optimal cut-off frequency determined by the process described above (FIGS. 6b and 6f). The filtered density estimates then undergo a subtraction operation (FIG. 6g), an absolute-value generation (FIG. 6h), a summing operation (i.e., a monotonization), and a normalization operation, in accordance with the flow chart of FIG. 13. The series of density estimates DSWF(j) is thereby transformed into a monotonically rising mapping function A=f(E) (FIG. 6i). There can preferably be a differentiation (FIG. 6c) instead of the subtraction operation, or an integration (FIG. 6e) in place of the summation. Differentiation and integration allow for a more precise determination of the mapping function A=f(E).

An example illustrating the monotonization process is shown in FIGS. 6e and 6i. The aim of the method is to convert falling and rising function values of the filtered density estimates DSWF(E) or DSWF(j) into rising function values. The function range of the mapping function A=f(E) is divided into equally-sized sub-ranges. The subdivisions of the function range are translated to the input value range by way of the inverse function, E=f$^{-1}$(A) (see FIG. 14). FIGS. 6e and 6i depict how the division of the function-value range is translated to the input value range. As can be seen from FIGS. 6e and 6i, application of the above-described method results in many small partitions in those input value sub-ranges over which the mapping function A=f(E) rises, and fewer, larger partitions in those input value sub-ranges over which the value of the mapping function changes only slightly. Furthermore, it is guaranteed, through the low-pass filtering and the subsequent checking of the variance of the filtered density estimates (DSWF(E), DSWF(j)) with the density estimates ST(j), that the statistical fluctuations in the estimated density estimates do not exceed a predetermined measure.

The quantization of the range of input values, determined by using the method above, is stored in the storage device 84 (shown in FIG. 7) as a new quantization Q2. Tests demonstrate that a low-pass filtering of the mapping function, A=f(E), carried out before determining the quantization and with the same cut-off frequency as that used in the low-pass filtering of the density estimates, improves the determination of the quantization.

In an alternative embodiment, the changes in the partition boundaries PG2(j) are multiplied by a factor of between 0 and 1, and stored as new partition boundaries PG2(j) in the storage device 84.

What is claimed:

1. A method for classifying objects, comprising the steps of:

measuring a parameter of each of a plurality of objects;

dividing a range of parameter values into partitions;

assigning measured parameter values to the partitions;

determining a density estimate for each partition based upon a relative frequency with which the measured parameter values are assigned to the partitions;

based on the density estimates, redividing the range of parameter values into new partitions, each new partition having a plurality of new density estimates, such that a difference between two of the new density estimates of a new partition does not exceed a predetermined value; and classifying each object in accordance with the new partition in which the measured parameter of the object falls.

2. The method according to claim 1, further comprising the steps of:

storing a count value for each partition in a storage device;

incrementing by one the count values of the partitions to which a measured parameter value was assigned; and determining the density estimates of the partitions by dividing the stored count values by the total number of measured parameter values and by the size of the corresponding partitions; and replacing the density estimates with the new density estimates.

3. The method according to claim 1, further comprising the steps of:

low-pass filtering the density estimates into a continuous estimated-value function;

performing a subtraction operation on the continuous estimated-value function;

generating an absolute value function from the subtracted continuous estimated-value function;

performing a summation operation on the absolute value function to generate a mapping function;

normalizing the range of the mapping function;

dividing the range of the mapping function into a predetermined number of sub-ranges; and translating the sub-ranges into new partitions in the range of measured parameter values, using an inverse function of the mapping function.

4. The method according to claim 2, further comprising the step of:

weighting the stored count values by a factor with a value $\geq 0$ and $\leq 1$ based upon overlapping of the partitions with the new partitions and a change in the partitions.

5. The method according to claim 3, wherein the dividing step includes the sub-step of dividing the range of function values of the mapping function into a fixed number of sub-ranges with a bottom sub-range and top sub-range and at least two equally sized middle sub-ranges, the bottom and top sub-ranges being smaller than the middle sub-ranges.

6. The method according to claim 3, wherein the low-pass filtering is carried out only at midpoints of the partitions.

7. The method according to claim 3, wherein the low-pass filtering is performed at a cut-off frequency which is determined by calculating a variance between the density estimates and the filtered density estimates and setting the cut-off frequency so that a maximum variance does not exceed a predetermined variance value.

8. The method according to claim 7, wherein the variance is determined only at the midpoints of the partitions.

9. The method according to claim 3, wherein the mapping function is low-pass filtered.

10. The method according to claim 3, wherein new partition boundaries are determined by weighting changes between new and old partitions by a factor $\geq 0$ and $\leq 1$, and adding the weighted changes to old partition boundaries.

11. The method according to claim 3, wherein the subtraction operation includes differentiation, and the summation operation includes integration.

12. The method according to claim 3, wherein the absolute-value generating step includes the sub-steps of squaring and generating a square root.

13. The method according to claim 5, wherein the bottom and top sub-ranges are one-half the size of the middle sub-ranges.

14. A system for adaptively quantizing a range of input values, comprising:

an input interface for reading-in input values; a processor for:
- dividing a range of input values into partitions;
- assigning input values to the partitions;
- determining a density estimate for each partition based upon a relative frequency with which the input values are assigned to the partitions;
- redividing the range of input values into new partitions based on the density estimates, each new partition having a plurality of new density estimates, such that a difference between two of the new density estimates of a new partition does not exceed a predetermined value;
- classifying at least one object as a function of the new partition; and an output interface for outputing the new density estimate values.

15. A system for adaptively quantizing a range of input values, comprising:

input means for reading-in input values;

dividing means for dividing a range of input values into partitions;

assigning means for assigning input values to the partitions;

determining means for determining a density estimate for each partition based upon a relative frequency with which the input values are assigned to the partitions;

redividing means for redividing the range of input values into new partitions, based on the density estimates, with each new partition having a plurality of new density estimates such that a difference between two of the new density estimates of a new partition does not exceed a predetermined value; and classifying means for classifying at least one object as a function of the new partition.

* * * * *